US010158972B2

(12) United States Patent
Nord

(10) Patent No.: US 10,158,972 B2
(45) Date of Patent: Dec. 18, 2018

(54) SELECTIVELY USING BEACON RADIO NODE LOCATION TO DETERMINE USER EQUIPMENT LOCATION BASED ON SENSED MOVEMENT OF THE BEACON RADIO NODE

(71) Applicant: Sony Corporation, Tokyo (JP)

(72) Inventor: Lars Nord, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 651 days.

(21) Appl. No.: 14/640,827

(22) Filed: Mar. 6, 2015

(65) Prior Publication Data

US 2016/0261986 A1 Sep. 8, 2016

(51) Int. Cl.
*H04W 64/00* (2009.01)
*H04W 4/02* (2018.01)
*H04W 4/04* (2009.01)
*H04W 4/90* (2018.01)

(52) U.S. Cl.
CPC .......... *H04W 4/023* (2013.01); *H04W 4/043* (2013.01); *H04W 64/00* (2013.01); *H04W 4/90* (2018.02)

(58) Field of Classification Search
CPC .. H04W 40/244; H04W 4/027; H04L 61/609; H04L 63/0876; H04B 17/318; H04B 17/27
See application file for complete search history.

(56) References Cited

U.S. PATENT DOCUMENTS

| 7,433,673 | B1 | 10/2008 | Everson et al. | |
|---|---|---|---|---|
| 2001/0046850 | A1* | 11/2001 | Blanke | H04M 1/72502 455/411 |
| 2006/0240840 | A1* | 10/2006 | Morgan | G01S 5/02 455/456.1 |
| 2011/0177831 | A1 | 7/2011 | Huang | |
| 2015/0356289 | A1* | 12/2015 | Brown | G06F 21/44 726/7 |

OTHER PUBLICATIONS

International Search Report and Written Opinion Corresponding to International Application No. PCT/JP2015/004631; dated Nov. 20, 2015; 11 Pages.

* cited by examiner

*Primary Examiner* — Kathy Wang-Hurst
*Assistant Examiner* — Said M Elnoubi
(74) *Attorney, Agent, or Firm* — Tucker Ellis LLP

(57) ABSTRACT

A method in a location service client node includes maintaining a database containing a listing of beacon radio node identifiers with their geographic locations. A received location request contains an identifier for a UE and an identifier for a beacon radio node. A geographic location of the UE is determined from the database using the geographic location of the identifier for the beacon radio nodes. A message is sent to a public safety system containing the identifier for the UE and the geographic location. Subsequent to sending the message to the public safety system, a received movement notification message contains the identifier for the beacon radio node and data indicating that the beacon radio node has been moved. Data in the database is set to prevent the geographic location of the beacon radio node from being subsequently used to determine the geographic location of a UE.

18 Claims, 7 Drawing Sheets

SELECTIVELY USING BEACON RADIO NODE LOCATION TO DETERMINE USER EQUIPMENT LOCATION BASED ON SENSED MOVEMENT OF THE BEACON RADIO NODE

FIELD OF THE INVENTION

The present invention relates to wireless communication systems and, more particularly, to methods and apparatuses which determine locations of user equipment within wireless communication systems.

BACKGROUND

Improving the technology that is available for determining the geographic location of user equipment, such as cellular phones, inside buildings has been an important area for research and even more so responsive to new initiatives by the Federal Communications Commission (FCC) in the United States. GPS provides accurate location services while a GPS enabled user equipment has an unobstructed view of the sky. However, GPS signals are very faint and cannot usually be received indoors or when obstructed in outdoor urban areas.

The present location determination systems used for emergency calling has been determined in some circumstances to fail during more than 50% of e911 calls originated from user equipment inside buildings. The FCC has therefore asked the telecommunications industry to provide improved terrestrial positioning systems. New proposed positioning systems include NextNav's system that uses powerful terrestrially-based transmitters to transmit very precise timed signal and information over a GPS-like channel about the geographic location of the transmitters. However, these systems will require significant investment to deploy new infrastructure.

The FCC, other governmental agencies, and wireless operators are concerned about possible third party manipulation of the geographical location reported during an e911 call. User equipment are only allowed to report actual raw data from GPS signals and cell tower positioning signals to the positioning infrastructure where all calculations and geographical positioning estimation is performed.

The FCC has proposed using Wi-Fi Access points and Bluetooth beacons for indoor positioning. One such approach develops a central database of known locations of Wi-Fi access points which is used to determine the location of user equipment which have reported in an emergency call; identifiers of local Wi-Fi access points, and corresponding radio link parameters. However, Wi-Fi access points are inherently mobile which further heightens concern about third party manipulation of the geographical location determined during an emergency call.

SUMMARY OF THE INVENTION

Methods and associated location service client nodes and beacon radio nodes are disclosed that selectively use locations of the beacon radio nodes for determining the location of a user equipment node based on whether various conditions associated with movement of the beacon radio nodes have occurred. These methods and apparatuses may improve the trustworthiness of positioning services that are preformed using the locations of beacon radio nodes.

Some embodiments are directed to a method in a location service client node that includes maintaining a database containing a listing of beacon radio node identifiers with their geographic locations. The method further includes receiving a location request containing an identifier for a user equipment node (UE) and an identifier for one of the beacon radio nodes, determining a geographic location of the UE based on obtaining from the database the geographic location of the identifier for the one of the beacon radio nodes received in the location request, and sending to a public safety system a message containing the identifier for the UE and the geographic location obtained from the database. The method further includes subsequent to sending the message to the public safety system, receiving a movement notification message containing the identifier for the one of the beacon radio nodes and data indicating that the one of the beacon radio nodes has been moved. Based on receipt of the movement notification message indicating that the one of the beacon radio nodes has been moved, data in the database is set to prevent the geographic location of the one of the beacon radio nodes in the listing maintained in the database from being subsequently used to determine the geographic location of a UE.

Some other embodiments are directed to a method in a beacon radio node that includes sensing movement of the beacon radio node based on a signal from a movement detector. Based on the sensing of the movement, a message is generated containing an identifier for the beacon radio node and data indicating that the beacon radio node has been moved. The message is communicated from the beacon radio node to a location service client node.

Other location service client nodes, beacon radio nodes, and methods according to embodiments of the invention will be or become apparent to one with skill in the art upon review of the following drawings and detailed description. It is intended that all such location service client nodes, beacon radio nodes, and methods be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

The present invention will be described more fully hereinafter with reference to the accompanying figures, in which embodiments of the invention are shown. This invention may, however, be embodied in many alternate forms and should not be construed as limited to the embodiments set forth herein.

As explained above, some wireless communications operators in the United States have proposed using a central database of known locations of Wi-Fi access points to determine the location of UEs using identifiers of observed Wi-Fi access points the UEs have reported. However, Wi-Fi access points are inherently mobile which further heightens concern about third party manipulation or other uncertainty with the geographical location determined during an emergency call.

Various embodiments of the present disclosure seek to reduce or avoid these problems by configuring a beacon radio node to detect when it has been physically moved, such as being carried between locations, and to report detected movement to a network node for use in updating the database to prevent the geographic location of the beacon radio node from being used to determine the location of a UE. As used herein, a beacon radio node can be any type of electronic device having a unique identifier that can be received by a UE through a radio interface and reported to a database for use in retrieving a location of the beacon radio node to determine a location of the UE. The beacon radio node can include, for example, a Wi-Fi access point, a Bluetooth device, etc.

Figure 1:
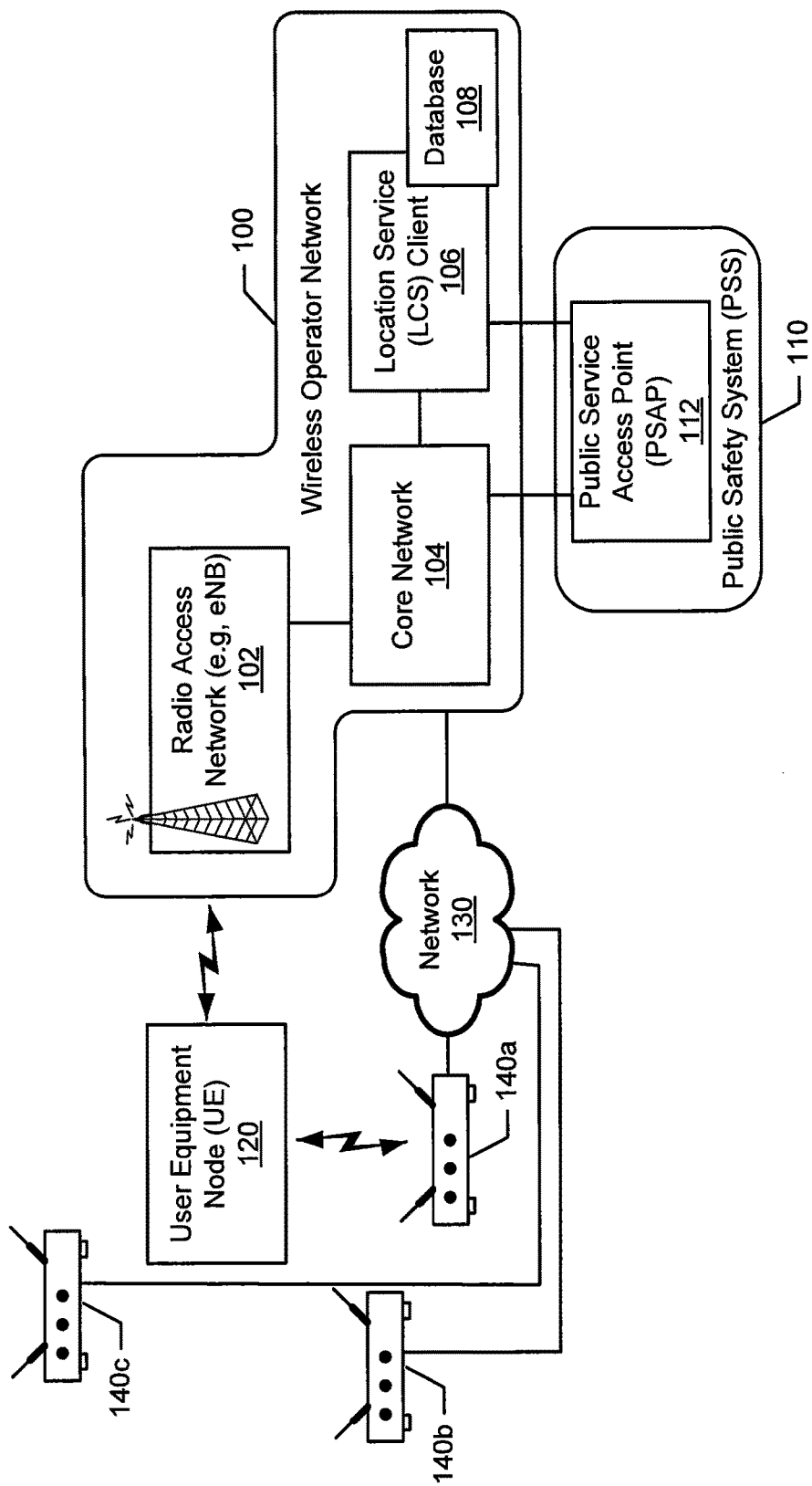
FIG. 1 is a schematic block diagram of an example wireless operator network that determines the location of a user equipment node based on the location of a beacon radio node, and provides the location to a public safety system in accordance with some embodiments of the present disclosure.

FIG. 1 is a schematic block diagram of an example wireless operator network 100 that operates with a public safety system (PSS) 110 to determine and provide a location of a UE 120 to a public service access point (PSAP) 112 as part of an emergency communication, such as an emergency call (e.g., e911 telephone call) or emergency text message originated from the UE 120. The wireless operator network 100 includes a location service (LCS) client 106 that maintains a database 108 containing a listing of beacon radio node identifiers (e.g., Basic Service Set Identifiers (BSSIDs)) and their known geographic locations, which is used to determine the geographic locations of UEs 120. In accordance with various embodiments disclosed herein, the database 108 is selectively updated based on whether an identified beacon radio node has been determined to have moved from the known geographic location. Responsive to the beacon radio node being determined to have been moved, its location data stored in the database 108 is no longer considered accurate and, therefore, is not further relied upon to determine the location of any UE. Numerous different decision conditions are disclosed herein which can be considered when determining whether the location data of a beacon radio node is no longer accurate and when it is again considered accurate for use in determining the location of a UE.

In one embodiment, a plurality of beacon radio nodes 140a, 140b, 140c can communicate messages through a data network 130 (e.g., the Internet) to the LCS client 106, and can communicate with the UE 120 through a wireless interface. Any number of beacon radio nodes may be used with embodiments of the present disclosure. One or more of the beacon radio nodes 140a, 140b, 140c may alternatively be a Bluetooth transceiver device that communicates messages through the UE 120 and radio access network (RAN) 102 of the wireless operator network 100 to reach the LCS client 106. The UE 120 may include any device that can communicate through a wireless interface with the wireless operator network 100, and may include, but is not limited to, a mobile telephone (cellular telephone), wireless data terminal, mobile station, laptop/portable computer, tablet computer, desktop computer, etc. The RAN 102 may contain one or more cellular radio access technology systems that may include, but are not limited to, wideband-CDMA, Universal Mobile Telecommunications System (UMTS), and/or 3GPP LTE (3rd Generation Partnership Project Long Term Evolution) radio transceiver stations.

The UE 120 receives an identifier (e.g., BSSID) of each of the beacon radio nodes 140a, 140b, 140c, and may further measure the received signal strength of signals from the beacon radio node 140. When establishing an emergency call (e.g., e911 telephone call) or sending an emergency text message to the public safety system 110, the UE 120 can include the identifier for the beacon radio node 140 in the call or message when the UE 120 determines it is within communication range of the beacon radio node 140. The LCS client 106 can query the database 108 using the identifier for the beacon radio node 140 that is received from the UE 120, to determine the geographic location of the beacon radio node 140 which is assumed to be proximately located to the location of the UE 120. The LCS client 106 can provide the geographic location of the beacon radio node 140 to the public safety system 110 and, more particularly, to the PSAP 112 with the emergency call or the emergency text message. The LCS client 106 may determine location of the UE 120 based on a triangulation operation performed based on the locations of the identified beacon radio nodes 140a, 140b, 140c. The LCS client 106 may improve the accuracy of the positioning by performing the triangulation operation based on signal strength measurements reported by the UE 120 on signals it received from the beacon radio nodes 140a, 140b, 140c. Public safety personnel can thereby be informed of the location of a person who is operating the UE 120 when establishing the emergency call or sending the emergency text message.

Figure 4:
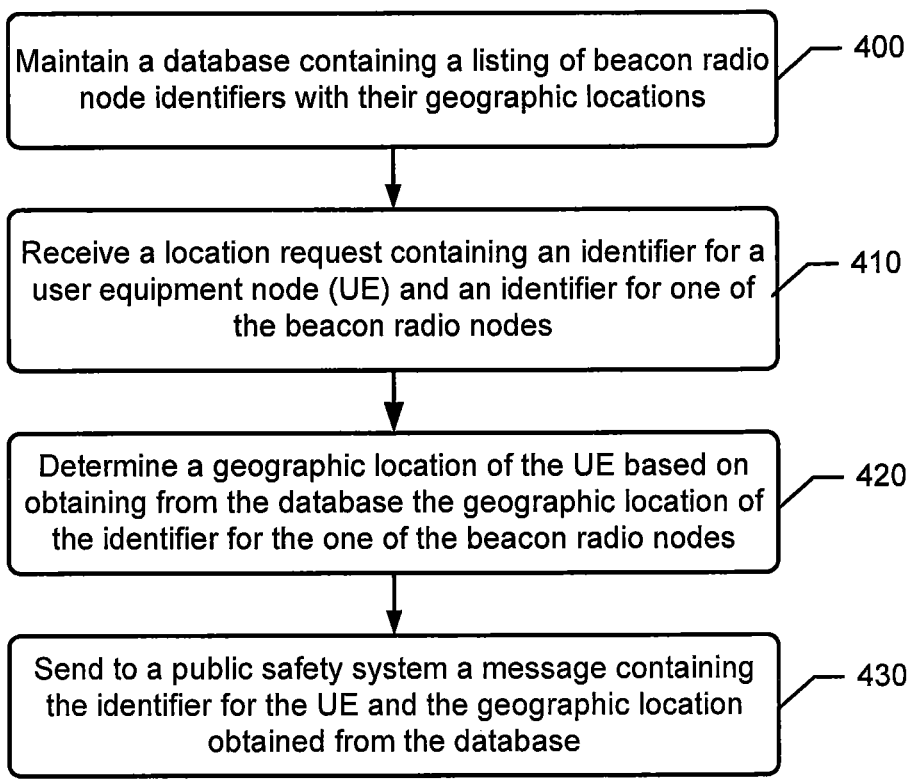
FIGS. 4, 5, and 6 are flowcharts of operations and methods that may be performed by a location service client node according to some embodiments of the present disclosure.

FIG. 4 is a flowchart of operations and methods that may be performed by the LCS client 106 and, for example, by the database 108 accessed by the LCS client 106. Referring to FIGS. 1 and 4, the database 108 manages (block 400) a listing of beacon radio node identifiers with their geographic locations. The database 108 receives (block 410) a location request containing an identifier (e.g., Mobile Station Identifier (MSID)) for the UE 120 and an identifier (e.g., BSSID) for one of the beacon radio nodes 140. The database 108 determines (block 420) a geographic location of the UE 120 based on obtaining from the database the geographic location of the identifier for the one of the beacon radio nodes received in the location request. The database 108 sends (block 430) to the public safety system 110 and, more particularly, to the PSAP 112 a message containing the identifier for the UE 120 and the geographic location obtained from the database 108.

Figure 5:
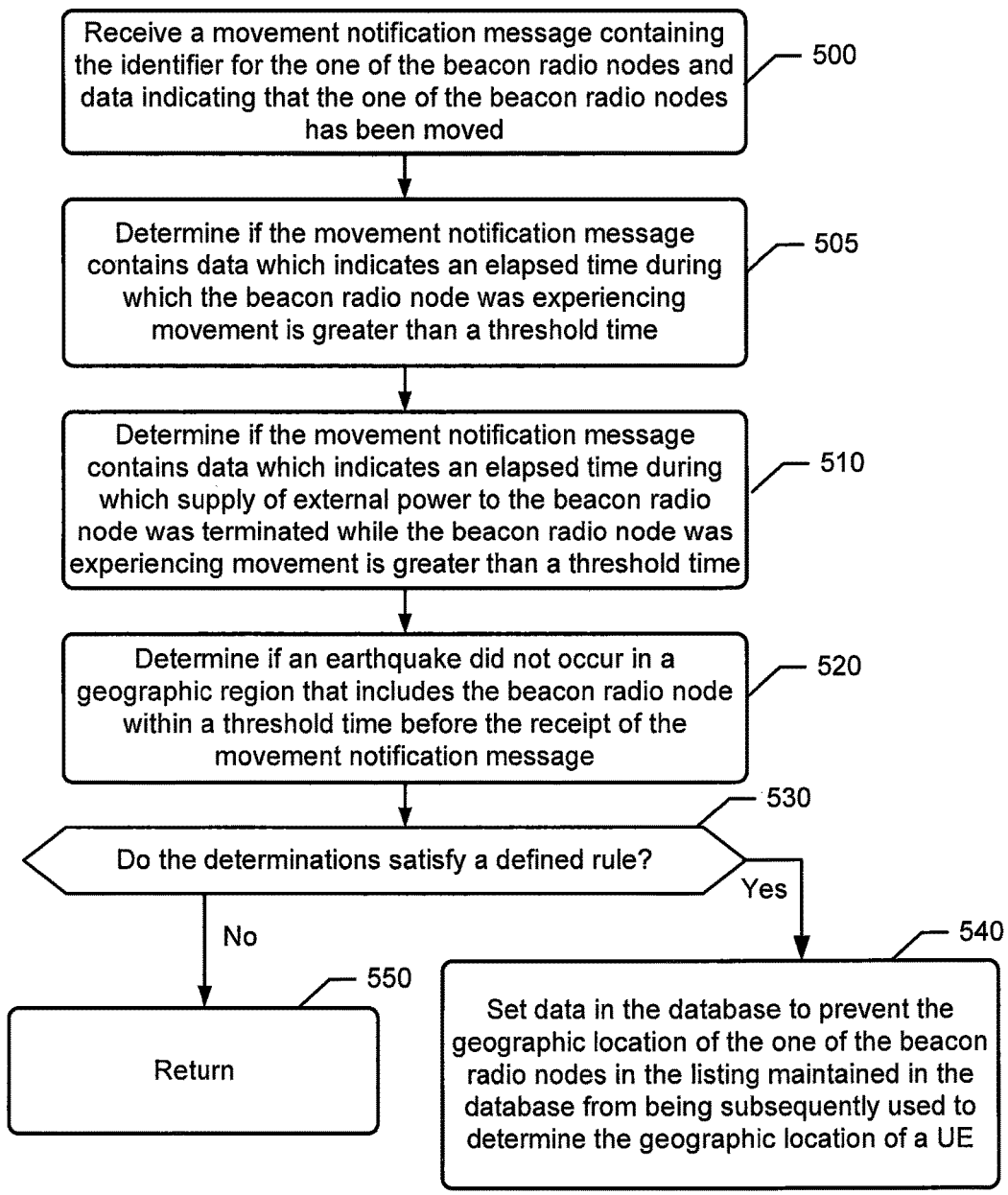

Reference is now further made to the operations and methods shown in FIG. 5 that may be performed by the LCS client 106 and, for example, by the database 108. Subsequent to sending the message to the public safety system 110, the database 108 receives (block 500) a movement notification message containing the identifier for the beacon radio node 140 and data indicating that the beacon radio node 140 has been moved. Based on receipt of the movement notification message indicating that the beacon radio node 140 has been moved, the database 108 sets (block 540) data in the database 108, such as by writing or modifying the stored data, to prevent the geographic location of the beacon radio node 140 in the listing maintained in the database 108 from being subsequently used to determine the geographic location of a UE 120.

The operation of setting data in the database 108 to prevent the geographic location of the beacon radio node 140 in the listing maintained in the database 108 from being subsequently used to determine the geographic location of the UE 120, may include modifying the listing maintained in the database 108 to indicate that the beacon radio node 140 is blacklisted responsive to the receipt of the movement notification message containing the identifier for the beacon radio node 140, and preventing the geographic location of any blacklisted ones of the beacon radio nodes in the listing maintained in the database 108 from being used to determine the geographic location of the UE 120 or any other UE.

In some embodiments further conditions (e.g., programmatic rules) are analyzed to determine (block 530) whether reported movement of the beacon radio node 140 will cause performance of the operations to set data in the database 108 to prevent the geographic location of the beacon radio node 140 in the listing maintained in the database 108 from being subsequently used to determine the geographic location of a UE 120. With further reference to FIG. 5, the operations can include determining (block 505) if the movement notification message contains data which indicates that an elapsed time during which the beacon radio node 140 was experiencing movement is greater than a threshold time.

The movement notification message may further contain data indicating whether supply of external power to the beacon radio node 140 was terminated while the beacon radio node 140 was experiencing movement. The operations can include determining (block 510) if an elapsed time during which supply of external power to the beacon radio node 140 was terminated while the beacon radio node 140 was experiencing movement, is greater than a threshold time.

The operations can include determining (block 520) if an earthquake did not occur in a geographic region that includes the beacon radio node 140 within a threshold time before the receipt of the movement notification message. Determining whether an earthquake occurred may be based on the determinations of blocks 510 and 520 and/or based on other operations that are disclosed herein. If an earthquake occurred in the geographic region that includes the beacon radio node 140, then the observed movement of the beacon radio node 140 can be attributed to the earthquake and not to a user moving the beacon radio node 140 to another geographic location. Thus, determining that an earthquake occurred in this manner can be a condition for continuing to allow the location of the beacon radio node 140, which was previously stored in the database 108, to be used to determine the location of UEs in spite of movement being reported by the beacon radio node 140. In contrast, determining that an earthquake did occurred in this manner can be a condition for ceasing to allow the location of the beacon radio node 140, which was previously stored in the database 108, to be used to determine the location of UEs in response movement being reported by the beacon radio node 140.

The operation of setting data (block 540) in the database 108 is selectively performed based on whether a defined rule is determined (block 530) by the determinations of one or more of blocks 505, 510, and/or 520. The determination of two of more of blocks 505, 510, and/or 520 may be combined in any order to determine (block 540) whether the defined rule is satisfied.

When the defined rule is satisfied, data is set (block 540) in the database 108 to prevent the geographic location of the beacon radio node 140 in the listing maintained in the database 108 from being subsequently used to determine the geographic location of the UE 120. In contrast, when the defined rule is not satisfied, the operations can return (block 550) the procedure.

For example, when a defined rule is satisfied (block 540) by data contained in the movement notification message indicating that the beacon radio node 140 was moved (e.g., carried) for more than a threshold time and/or indicating that supply of external power to the beacon radio node 140 was terminated for more than a threshold time, the operations (block 540) are performed to set data in the database 108 to prevent the geographic location of the beacon radio node 140 in the listing maintained in the database 108 from being subsequently used to determine the geographic location of the UE 120. In contrast, based on the defined rule not being satisfied (block 540) by data contained in the movement notification message indicating that the beacon radio node 140 was being moved for less than a threshold time and/or indicating that supply of external power to the beacon radio node 140 was terminated for less than a threshold time, the operations (block 540) are not performed to set data in the database 108 by returning (block 550) from the procedure.

However, the rule may further condition the selective setting of the data based on whether an earthquake occurred. For example, based on determining that an earthquake did occur within the threshold time, the operations (block 540) are not performed to set data in the database 108 to prevent the geographic location of the beacon radio node 140 in the listing maintained in the database 108 from being subsequently used to determine the geographic location of the UE 120, e.g., by returning (block 550) from the procedure. In contrast, based on determining that an earthquake did not occur within the threshold time, the operations (block 540) are performed to set data in the database 108 to prevent the geographic location of the beacon radio node 140 in the listing maintained in the database 108 from being subsequently used to determine the geographic location of the UE 120.

To determine (block 530) whether an earthquake occurred in a geographic region that includes the geographic location of the beacon radio node 140 within a threshold time before the receipt of the movement notification message, the database 108 can determine whether within a threshold time of receipt of the movement notification message, movement notification messages are received from a threshold number of other beacon radio nodes that are within a threshold distance of the beacon radio node 140. When a threshold number of movement notification messages have been received, an earthquake can be determined to have occurred.

Figure 6:
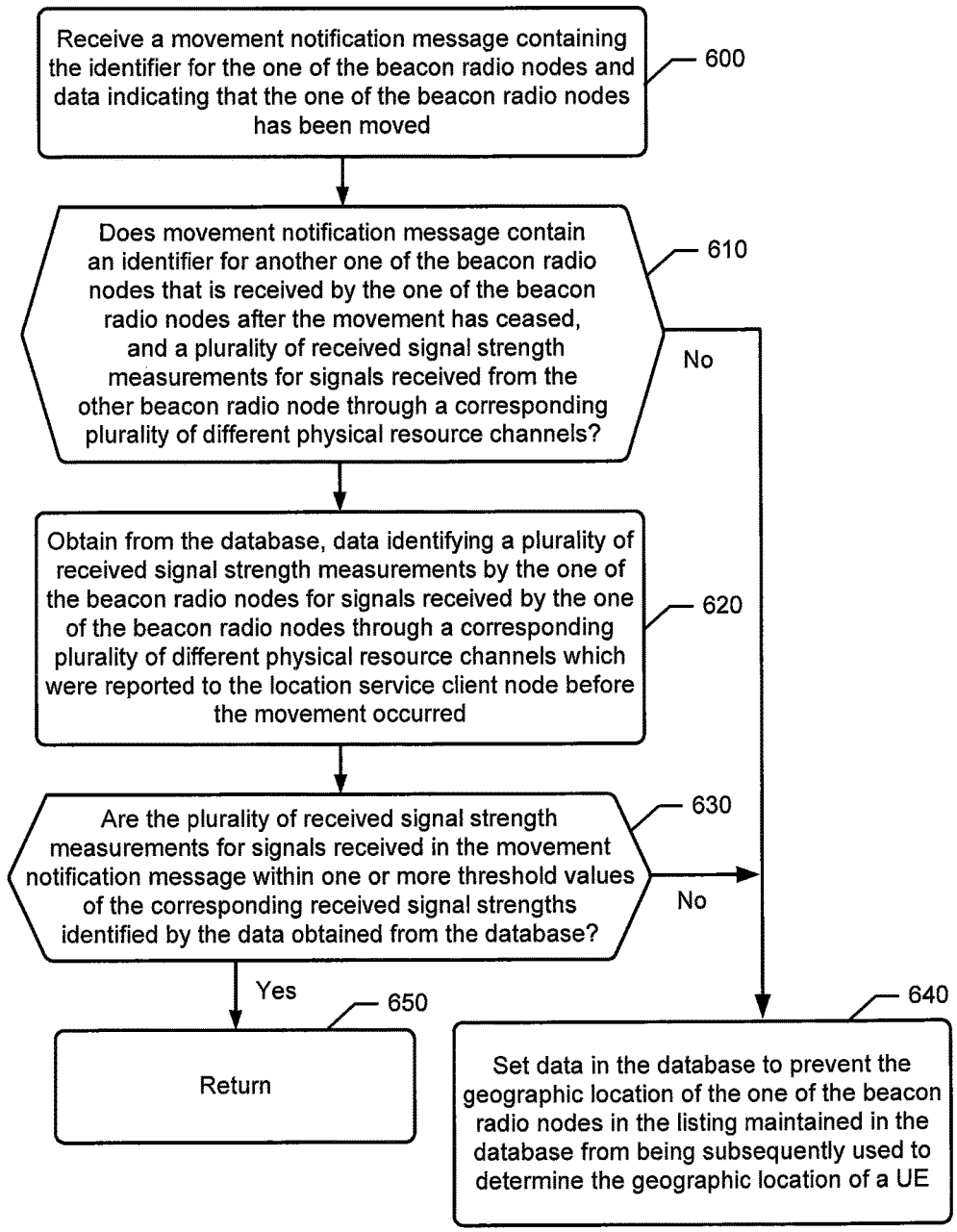

FIG. 6 illustrates a flowchart of further operations and methods that may be performed by the LCS client 106 or the database 108 to determine further conditions for when a movement notification message indicating movement of the beacon radio node 140 triggers setting data in the database 108 prevent the geographic location of the beacon radio node 140 from being subsequently used to determine the geographic location of the UAE 120. Referring to FIG. 6, the database 108 may receive (block 600) the movement notification message which further contains an identifier for another beacon radio node that is received by the beacon radio node 140 after the movement has ceased. For example, the beacon radio node 140 may scan to identify other beacon radio nodes that are within a communication range of the beacon radio node 140, e.g., by obtaining BSSID identifiers for the one or more other beacon radio nodes.

The continued presence of other beacon radio nodes proximately located to the beacon radio node 140 following completion of movement of the beacon radio node 140, can be used when determining whether the beacon radio node 140 has moved a sufficient distance such that its location identified in the database 108 should no longer be used to determine the location of UEs. The database 108 can determine (block 610) whether the movement notification message containing an identifier for another one of the beacon radio nodes is received by the beacon radio node 140 after the movement it sensed has ceased. If more than one beacon radio node is identified, the database 108 can obtain (block 620) from the database 108 the geographic locations of the beacon radio nodes identified by the movement notification message. The database 108 can compare (block 630) the geographic locations of the beacon radio nodes identified by the movement notification message. Based on the comparison satisfying a defined geographic proximity rule, e.g., which indicates that the beacon radio node 140 remains within communication range of another beacon radio node identified in the database 108 after the beacon radio node 140 has completed movement, the database 108 does not perform the operations (block 640) of setting data in the database 108 to prevent the geographic location of the beacon radio node 140 in the listing maintained in the database 108 from being subsequently used to determine the geographic location of the UE 120, e.g., by returning (block 650) from the procedure. In contrast, based on the comparison not satisfying the defined proximity rule, the database 108 performs the operations (block 640) of setting data in the database 108 to prevent the geographic location of the beacon radio node 140 in the listing maintained in the database 108 from being subsequently used to determine the geographic location of the UE 120.

Received signal strength measurements of the signals received from other beacon radio nodes can be used when determining whether the beacon radio node 140 has moved a sufficient distance such that its location identified in the database 108 should no longer be used to determine the location of UEs. In one embodiment, the movement notification message further contains an identifier for another beacon radio node that is received by the beacon radio node 140 after the movement has ceased, and a plurality of received signal strength measurements for signals received from the other beacon radio node through a corresponding plurality of different physical resource channels. The operations obtain from the database 108, data identifying a plurality of received signal strength measurements by the beacon radio node 140 for signals received by the beacon radio node 140 through a corresponding plurality of different physical resource channels which were reported to the location service client node 106 before the movement occurred. The operations identify whether the plurality of received signal strength measurements for signals received in the movement notification message are within one or more threshold values of the corresponding received signal strengths identified by the data obtained from the database 108. Based on the comparison, the operations select between performing and not performing the operations for setting data in the database 108 to prevent the geographic location of the beacon radio node 140 in the listing maintained in the database 108 from being subsequently used to determine the geographic location of the UE 120.

Thus, for example, when the movement notification message identifies another beacon radio node and received signal strength measurements of signals from the other busy radio node which are within one or more threshold values of received signal strengths that have been recorded in the database 108 is being previously measured by the beacon radio node 140, the beacon radio node 140 may be determined to have not moved a sufficient distance so that its location identified in the database 108 can continue to be used to determine the location of UEs.

The movement notification message may identify for each of the plurality of different radio resources, e.g., different frequencies and/or time slices, a received signal strength measurement. The received signal strength measurements across the different radio resources can thereby form a unique fingerprint of the signals received by the beacon radio node 140 from another beacon radio node and subject to the unique physical air channel between the nodes, which includes propagation effects on the signals from walls, furniture, ceilings and floors along the propagation channel between the nodes. The radio beacon node 140 can be determined to have moved at least the threshold distance based on a threshold difference occurring between what is reported in the movement notification message for a unique fingerprint of received signal strengths measured by the radio beacon node 140 on defined radio resources from one or more other radio beacon nodes and what has been previously recorded in the database 108 as a unique fingerprint of received signal strengths measured by the radio beacon node 140 on defined radio resources from the one or more other radio beacon nodes.

The operations for setting data in the database 108 to prevent the geographic location of a beacon radio node from being used to determine the location of the UE 120 can be selectively carried out based on whether the movement has been authorized. For example, based on receipt of the movement notification message indicating that the one of the beacon radio node 140 has been moved, the database 108 can determine based on information in the database 108 whether the movement has been authorized. Based on determining that the movement has been authorized, the operations (blocks 540 and 640) are not perform to set data in the database 108 to prevent the geographic location of the beacon radio node 140 in the listing maintained in the database from being subsequently used to determine the geographic location of the UE 120. In contrast, based on determining that the movement has not been authorized, the operations (blocks 540 and 640) are performed to set data in the database 108 to prevent the geographic location of the beacon radio node 140 in the listing maintained in the database from being subsequently used to determine the geographic location of the UE 120.

Figure 7:
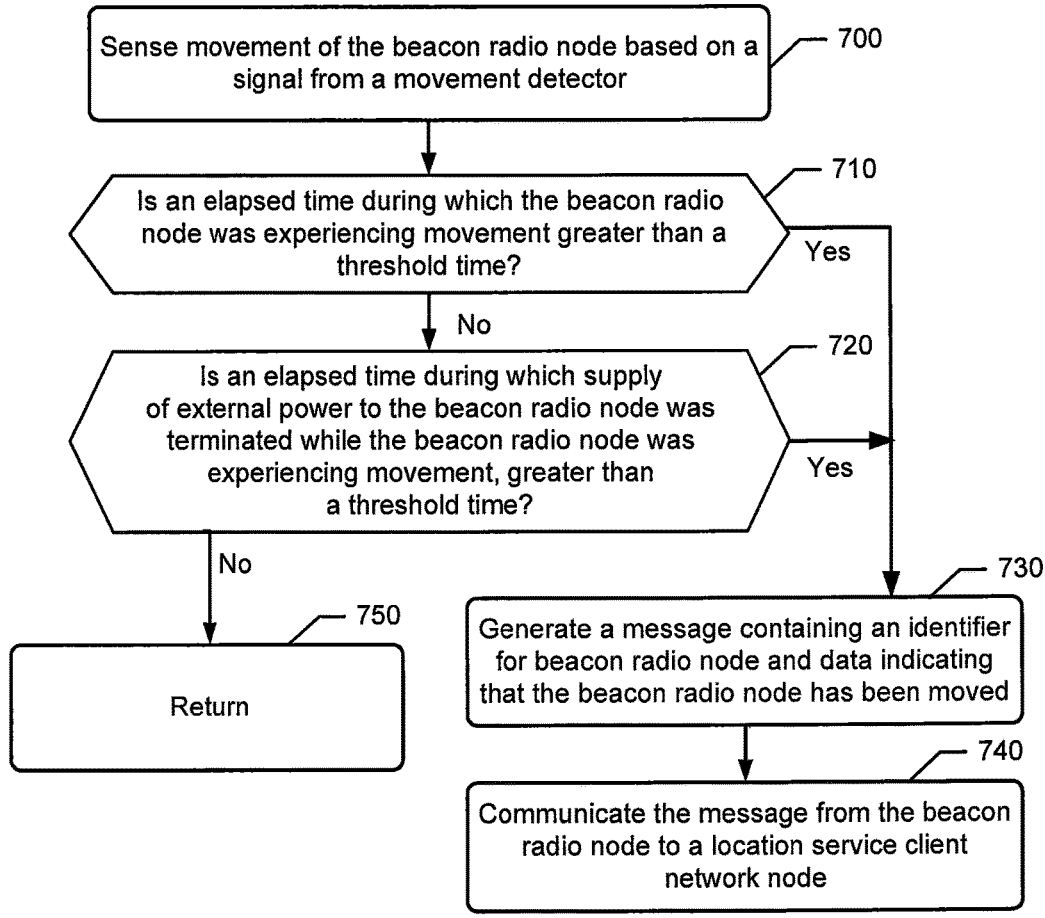
FIGS. 7 and 8 are flowcharts of operations and methods that may be performed by a beacon radio node according to some embodiments of the present disclosure.
Figure 8:
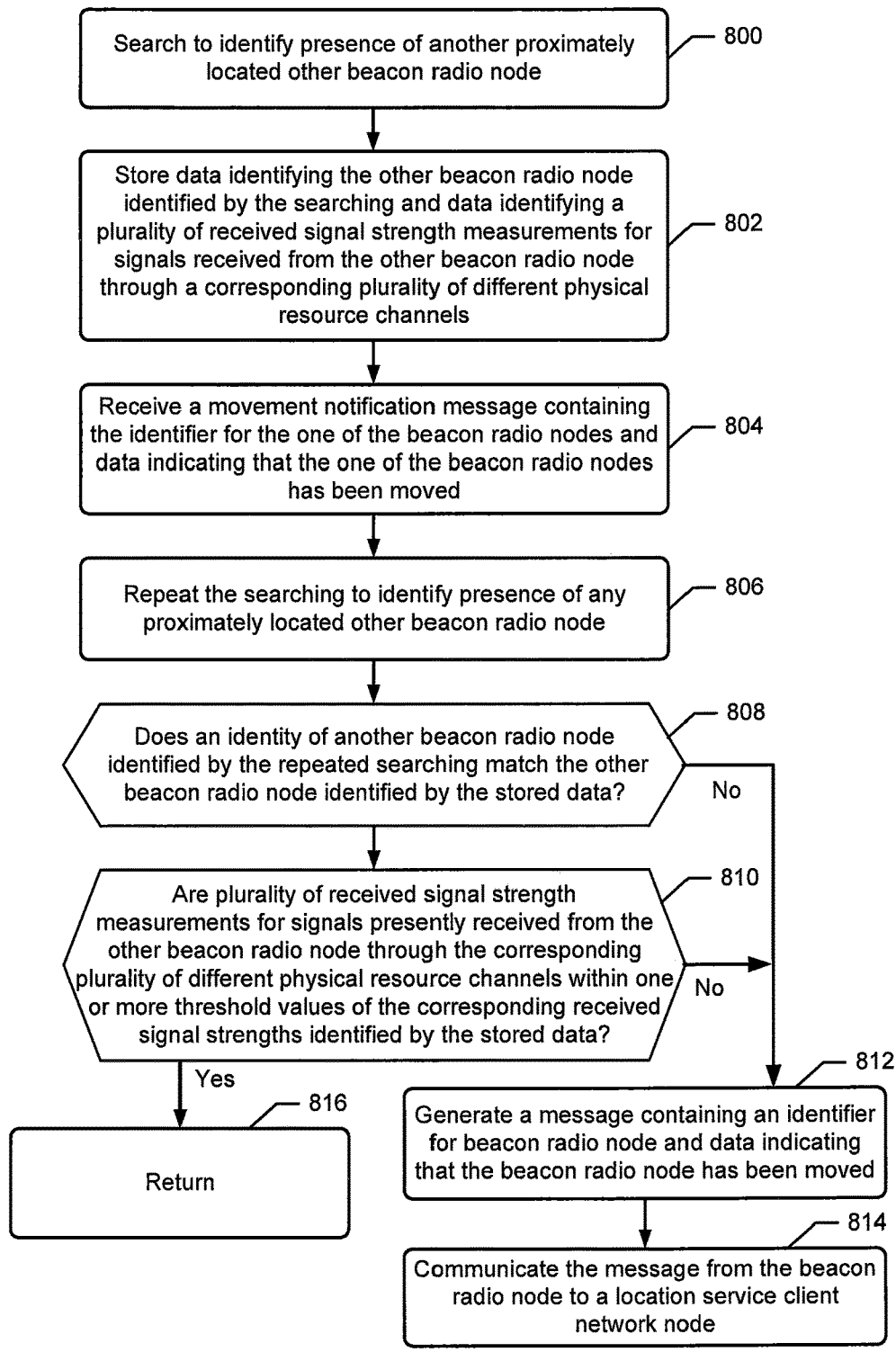

FIGS. 7 and 8 are flowcharts of operations and methods that may be performed by the beacon radio node 140 according to some embodiments of the present disclosure. The beacon radio node 140 can be configured to detect movement of itself and measure a time duration of the movement. Furthermore, when the beacon radio node 140 is powered by an external source (e.g., plugged into a regional power line), the node 140 may be configured to measure a time duration while external power remains terminated.

Figure 2:
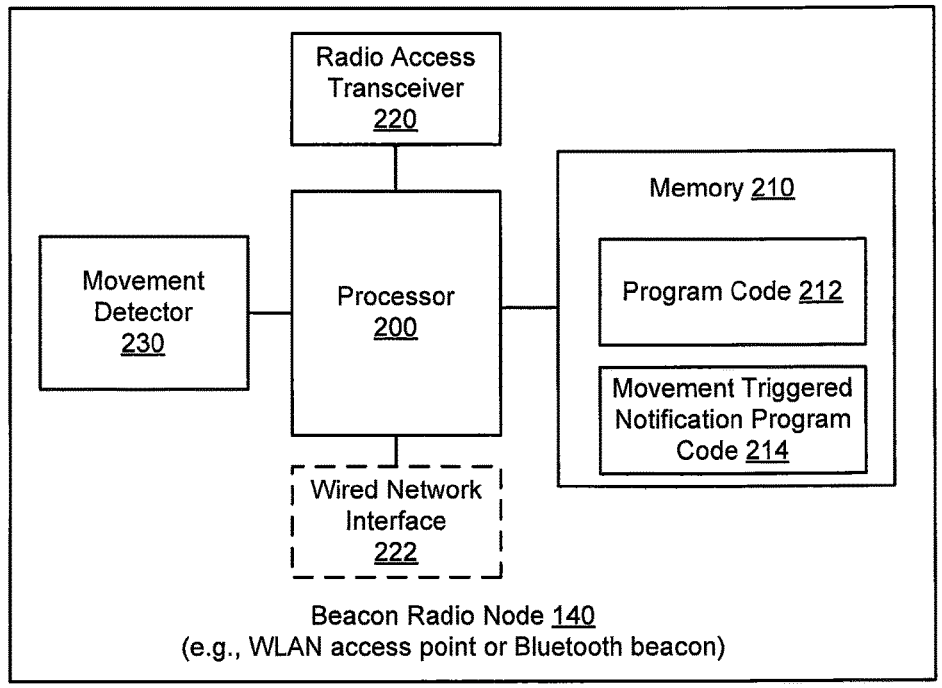
FIG. 2 is a block diagram of a beacon radio node that is configured according to some embodiments of the present disclosure.

Referring to FIG. 7, the beacon radio node 140 senses (block 700) movement of itself based on a signal from a movement detector 230 (FIG. 2). Based on the sensing of the movement, the beacon radio node 140 generates (block 730) a message containing an identifier for the beacon radio node 140 and data indicating that the beacon radio node 140 has been moved. The message is communicated (block 740) from the beacon radio node 140 to a location service client node 106.

Generation of the message may be contingent upon one or more further conditions being satisfied relating to movement of the beacon radio node 140. The beacon radio node 140 may determine an elapsed time during which the beacon radio node 140 was experiencing movement, and based on determining (block 710) that the elapsed time is less than a threshold time, not perform the operation (block 730) of generating a message containing an identifier for beacon radio node and data indicating that the beacon radio node has been moved. In contrast, based on determining (block 710) that the elapsed time is greater than the threshold time, the beacon radio node 140 can perform the operation (block 730) to generate a message containing an identifier for beacon radio node and data indicating that the beacon radio node has been moved.

In another embodiment, the beacon radio node 140 determines an elapsed time during which it was experiencing movement, and generates the message to further include data indicating the elapsed time. The message may thereby always be generated and communicated whenever movement of beacon radio node 140 is sensed, and the location service client node 106 may determine based on the elapsed time whether the beacon radio node 140 has moved a sufficient distance such that its location in the database should not be used to determine the location of any UEs.

In another embodiment, the beacon radio node 140 may determine whether supply of external power to the beacon radio node 140 was terminated while the beacon radio node 140 was experiencing movement. Based on determining (block 720) that the supply of external power to the beacon radio node 140 was not terminated while the beacon radio node 140 was experiencing movement, the beacon radio node 140 does not perform the operation (block 730) to generate a message containing an identifier for beacon radio node and data indicating that the beacon radio node has been moved. In contrast, based on determining that the supply of external power to the beacon radio node 140 was terminated while the beacon radio node 140 was experiencing movement, the beacon radio node 140 performs the operation (block 730) to generate a message containing an identifier for beacon radio node and data indicating that the beacon radio node has been moved.

The beacon radio node 140 may determine an elapsed time during which the supply of external power to itself was terminated while it was experiencing movement. Based on determining that the elapsed time is less than a threshold time, the beacon radio node 140 does not perform the operation (block 730) to generate a message containing an identifier for the beacon radio node 140 and data indicating that the beacon radio node 140 has been moved. In contrast, based on determining that the elapsed time is greater than a threshold time, the beacon radio node 140 performs the operation (block 730) to generate a message containing an identifier for the beacon radio node 140 and data indicating that the beacon radio node 140 has been moved.

In another embodiment, the beacon radio node 140 may determine whether supply of external power to the beacon radio node 140 was terminated while the beacon radio node 140 was experiencing movement, and generate the message to further include data indicating whether supply of external power to the beacon radio node 140 was terminated while the beacon radio node 140 was experiencing movement. The message may thereby always be generated and communicated whenever movement of beacon radio node 140 is sensed, and the location service client node 106 may determine based on whether supply of external power to the beacon radio node 140 was terminated while the beacon radio node 140 was experiencing movement, as whether the beacon radio node 140 has moved a sufficient distance such that its location in the database 108 should not be used to determine the location of any UEs.

In another embodiment, based on the sensing of the movement the beacon radio node 140 searches to identify presence of any proximately located other beacon radio nodes, and generates the message to further include data identifying any other beacon radio node identified by the searching.

Referring to the operations and methods of FIG. 8 according to some further embodiments, the beacon radio node 140 searches (block 800) to identify presence of any proximately located other beacon radio node, and stores (block 802) data identifying any other beacon radio node identified by the searching. Then, based on sensing movement (block 804), the beacon radio node 140 repeats (block 806) the searching to identify presence of any proximately located other beacon radio node. The beacon radio node 140 determines (block 808) whether an identity of any other beacon radio node identified by the repeated searching matches any beacon radio node identified by the stored data. Based on determining (block 808) that a match between identities is found, the beacon radio node 140 does not perform the operation to generate (block 812) a message containing an identifier for beacon radio node 140 and data indicating that the beacon radio node 140 has been moved, e.g., by returning (block 816) from the procedure. In contrast, based on determining that no match between identities is found, the beacon radio node 140 performs the operation to generate (block 812) a message containing an identifier for the beacon radio node 140 and data indicating that the beacon radio node has been moved.

In a further embodiment, the beacon radio node 140 searches (block 800) to identify presence of any proximately located other beacon radio node, and stores (block 802) data identifying the other beacon radio node identified by the searching and data identifying a received signal strength for a signal received from the other beacon radio node. Then, based on sensing movement (block 804), the beacon radio node 140 repeats (block 806) the searching to identify presence of any proximately located other beacon radio node. The beacon radio node 140 determines (block 810) whether an identity of any other beacon radio node identified by the repeated searching matches the other beacon radio node identified by the stored data and, when a match is determined, identifies whether a received signal strength of a signal presently received from the other beacon radio node is within a defined threshold value of the received signal strength identified by the stored data. Based on determining (block 810) that a match between identities is found and the received signal strengths are within the defined threshold value, the beacon radio node 140 does not perform the operation to generate (block 812) a message containing an identifier for the beacon radio node 140 and data indicating that the beacon radio node 140 has been moved, e.g., by returning (block 816) from the procedure. In contrast, based on determining (block 810) that a match between identities is not found or a match between identities is found but the received signal strengths are not within the defined threshold value, the beacon radio node 140 performs the operation to generate (block 812) a message containing an identifier for the beacon radio node 140 and data indicating that the beacon radio node 140 has been moved.

In a further embodiment, the beacon radio node 140 searches (block 800) to identify presence of any proximately located other beacon radio node, and stores (block 802) data identifying the other beacon radio node identified by the searching and data identifying a plurality of received signal strength measurements for signals received from the other beacon radio node through a corresponding plurality of different physical resource channels. Then, based on sensing movement (block 804), the beacon radio node 140 repeats (block 806) the searching to identify presence of any proximately located other beacon radio node. The beacon radio node 140 determines whether an identity of any other beacon radio node identified by the repeated searching matches the other beacon radio node identified by the stored data and, when a match is determined, identifies whether a plurality of received signal strength measurements for signals presently received from the other beacon radio node through the corresponding plurality of different physical resource channels are within one or more threshold values of the corresponding received signal strengths identified by the stored data. Based on determining that a match between identities is found and the present received signal strengths are within the one or more threshold values of the corresponding received signal strengths identified by the stored data, the beacon radio node 140 does not perform the operation to generate (block 812) a message containing an identifier for the beacon radio node 140 and data indicating that the beacon radio node 140 has been moved, e.g., by returning (block 816) from the procedure. In contrast, based on determining that a match between identities is not found or a match between identities is found but the present received signal strengths are not within the one or more threshold values of the corresponding received signal strengths identified by the stored data, the beacon radio node 140 performs the operation to generate (block 812) a message containing an identifier for the beacon radio node 140 and data indicating that the beacon radio node 140 has been moved.

Example Beacon Radio Node and Location Service Client Node

FIG. 2 is a block diagram of a beacon radio node 140 that is configured to perform operations according to one or more embodiments disclosed herein. The beacon radio node 140 includes a processor circuit 200, a radio access transceiver 220, a movement detector 230, and a memory circuit 210 containing program code 212 and movement triggered notification program code 214. When the beacon radio node 140 is a Bluetooth-based communication device it may communicate through a UE 120 to communicate with the wireless operator network 100 and the public safety system 110. The beacon radio node 140 may further include a wired network interface 222, such as an ethernet interface connectable to a cable modem or other network edge device, to enable communications between the beacon radio node 140 and the wireless operator network 100 and/or the public safety system 110 via the data network 130.

The transceiver 220 is configured to communicate with UEs and may communicate with other radio network nodes through a wireless air interface using one or more of radio access technologies, such as those described herein. The processor circuit 200 may include one or more data processing circuits, such as a general purpose and/or special purpose processor, e.g., microprocessor and/or digital signal processor. The processor circuit 200 is configured to execute the program code 212 and the movement triggered notification program code 214 to perform at least some of the operations described herein as being performed by a beacon radio node.

The movement detector 230 may include an accelerometer, a tilt sensor, a gyro, and/or other device configured to sense physical movement of the beacon radio node 140. The program code 212 may operate to provide conventional beacon radio node functionality, such as Wi-Fi access point functionality and/or Bluetooth device functionality. The movement triggered notification program code 214 can be configured to respond to a movement signal from the movement detector 230 by generating a message containing an identifier (e.g., BSSID) for the beacon radio node 140 and data indicating that the beacon radio node has been moved, and communicating the message toward the location service client node 106 through the network 130 and/or through the UE 120.

Figure 3:
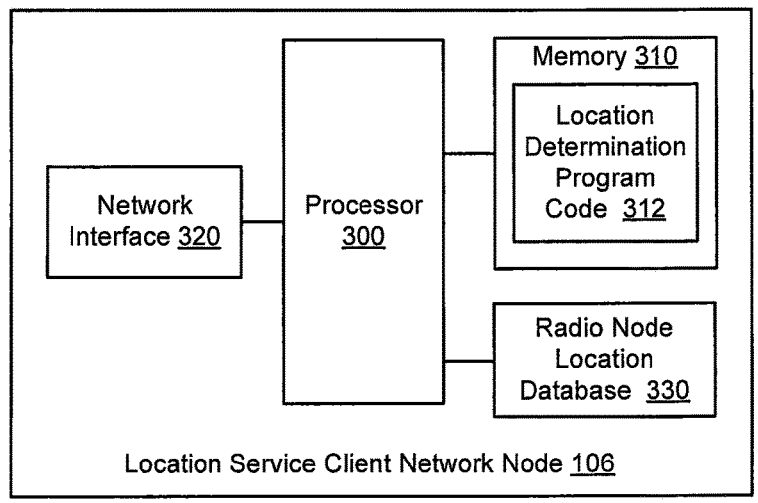
FIG. 3 is a block diagram of a location service client node that is configured according to some embodiments of the present disclosure.

FIG. 3 is a block diagram of a location service client node 106 that is configured according to one or more embodiments disclosed herein. The location service client node 106 includes a network interface 320, a radio node location database 330, a processor circuit 300, and a memory circuit 310 containing location determination program code 312.

The network interface 320 is configured to communicate with other components of the wireless operator network 100, such as the core network 104 and to receive messages from beacon radio nodes and UEs. The processor circuit 300 may include one or more data processing circuits, such as a general purpose and/or special purpose processor, e.g., microprocessor and/or digital signal processor, that may be collocated or distributed across one or more networks. The processor circuit 300 is configured to execute the location determination program code 312 to perform at least some of the operations and methods of described herein as being performed by a location service client node 106.

The database 330 contains a listing of beacon radio node identifiers (e.g., BSSIDs) and their known geographic locations. The location determination program code 312 operates to determine the geographic location of UEs based on calls, messages, rather communications generated by the UEs which contain identifiers for beacon radio nodes, radio link measurement data, and known geographic locations of those beacon radio nodes recorded in the radio node location database 330. The operations that are disclosed herein as being performed by the database 108 may be partially or wholly performed by the location service client node 106 and/or by another network node of the communication system.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when a node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluelRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method in a beacon radio node, the method comprising:

sensing movement of the beacon radio node, at the beacon radio node, based on a signal from a movement detector;

based on the sensing of the movement, generating, by the beacon radio node, a message containing an identifier for the beacon radio node and data indicating that the beacon radio node has been moved;

communicating, by the beacon radio node, the message from the beacon radio node to a location service client node;

determining whether supply of external power to the beacon radio node was terminated while the beacon radio node was experiencing movement;

based on determining that the supply of external power to the beacon radio node was not terminated while the beacon radio node was experiencing movement, not performing the method of generating a message containing an identifier for beacon radio node and data indicating that the beacon radio node has been moved; and based on determining that the supply of external power to the beacon radio node was terminated while the beacon radio node was experiencing movement, performing the method of generating a message containing an identifier for beacon radio node and data indicating that the beacon radio node has been moved.

2. The method of claim 1, further comprising:
determining an elapsed time during which the beacon radio node was experiencing movement; and
based on determining that the elapsed time is less than a threshold time, not performing the method of generating a message containing an identifier for beacon radio node and data indicating that the beacon radio node has been moved; and
based on determining that the elapsed time is greater than the threshold time, performing the method of generating a message containing an identifier for beacon radio node and data indicating that the beacon radio node has been moved.

3. The method of claim 1, further comprising:
determining an elapsed time during which the beacon radio node was experiencing movement; and
generating the message to further include data indicating the elapsed time.

4. The method of claim 1, further comprising:
determining an elapsed time during which the supply of external power to the beacon radio node was terminated while the beacon radio node was experiencing movement; and
based on determining that the elapsed time is less than a threshold time, not performing the method of generating a message containing an identifier for beacon radio node and data indicating that the beacon radio node has been moved; and
based on determining that the elapsed time is greater than a threshold time, performing the method of generating a message containing an identifier for beacon radio node and data indicating that the beacon radio node has been moved.

5. The method of claim 1, further comprising:
determining whether supply of external power to the beacon radio node was terminated while the beacon radio node was experiencing movement; and
generating the message to further include data indicating whether supply of external power to the beacon radio node was terminated while the beacon radio node was experiencing movement.

6. The method of claim 1, further comprising:
based on the sensing of the movement, searching to identify presence of any proximately located other beacon radio node; and
generating the message to further include data identifying any other beacon radio node identified by the searching.

7. The method of claim 1, further comprising:
searching to identify presence of any proximately located other beacon radio node;
storing data identifying any other beacon radio node identified by the searching;
based on the sensing of the movement,
repeating the searching to identify presence of any proximately located other beacon radio node, and
determining whether an identity of any other beacon radio node identified by the repeated searching matches any beacon radio node identified by the stored data;
based on determining that a match between identities is found, not performing the method of generating a message containing an identifier for beacon radio node and data indicating that the beacon radio node has been moved; and
based on determining that no match between identities is found, performing the method of generating a message containing an identifier for beacon radio node and data indicating that the beacon radio node has been moved.

8. The method of claim 1, further comprising:
searching to identify presence of another proximately located other beacon radio node;
storing data identifying the other beacon radio node identified by the searching and data identifying a received signal strength for a signal received from the other beacon radio node;
based on the sensing of the movement,
repeating the searching to identify presence of any proximately located other beacon radio node, and
determining whether an identity of any other beacon radio node identified by the repeated searching matches the other beacon radio node identified by the stored data and, when a match is determined, identifying whether a received signal strength of a signal presently received from the other beacon radio node is within a defined threshold value of the received signal strength identified by the stored data;
based on determining that a match between identities is found and the received signal strengths are within the defined threshold value, not performing the method of generating a message containing an identifier for beacon radio node and data indicating that the beacon radio node has been moved; and
based on determining that a match between identities is not found or a match between identities is found but the received signal strengths are not within the defined threshold value, performing the method of generating a message containing an identifier for beacon radio node and data indicating that the beacon radio node has been moved.

9. The method of claim 1, further comprising:
searching to identify presence of another proximately located other beacon radio node;
storing data identifying the other beacon radio node identified by the searching and data identifying a plurality of received signal strength measurements for signals received from the other beacon radio node through a corresponding plurality of different physical resource channels;
based on the sensing of the movement,
repeating the searching to identify presence of any proximately located other beacon radio node, and
determining whether an identity of any other beacon radio node identified by the repeated searching matches the other beacon radio node identified by the stored data and, when a match is determined, identifying whether a plurality of received signal strength measurements for signals presently received from the other beacon radio node through the corresponding plurality of different physical resource channels are within one or more threshold values of the corresponding received signal strengths identified by the stored data;
based on determining that a match between identities is found and the present received signal strengths are within the one or more threshold values of the corresponding received signal strengths identified by the stored data, not performing the method of generating a message containing an identifier for beacon radio node and data indicating that the beacon radio node has been moved; and
based on determining that a match between identities is not found or a match between identities is found but the present received signal strengths are not within the one or more threshold values of the corresponding received signal strengths identified by the stored data, performing the method of generating a message containing an identifier for beacon radio node and data indicating that the beacon radio node has been moved.

10. A method in a beacon radio node, the method comprising:
sensing movement of the beacon radio node, at the beacon radio node, based on a signal from a movement detector;
based on the sensing of the movement, generating, by the beacon radio node, a message containing an identifier for the beacon radio node and data indicating that the beacon radio node has been moved;
communicating, by the beacon radio node, the message from the beacon radio node to a location service client node;
searching to identify presence of any proximately located other beacon radio node;
storing data identifying any other beacon radio node identified by the searching;
based on the sensing of the movement,
repeating the searching to identify presence of any proximately located other beacon radio node, and
determining whether an identity of any other beacon radio node identified by the repeated searching matches any beacon radio node identified by the stored data;
based on determining that a match between identities is found, not performing the method of generating a message containing an identifier for beacon radio node and data indicating that the beacon radio node has been moved; and
based on determining that no match between identities is found, performing the method of generating a message containing an identifier for beacon radio node and data indicating that the beacon radio node has been moved.

11. The method of claim 10, further comprising:
determining an elapsed time during which the beacon radio node was experiencing movement; and
based on determining that the elapsed time is less than a threshold time, not performing the method of generating a message containing an identifier for beacon radio node and data indicating that the beacon radio node has been moved; and
based on determining that the elapsed time is greater than the threshold time, performing the method of generating a message containing an identifier for beacon radio node and data indicating that the beacon radio node has been moved.

12. The method of claim 10, further comprising:
determining an elapsed time during which the beacon radio node was experiencing movement; and
generating the message to further include data indicating the elapsed time.

13. The method of claim 10, further comprising:
determining whether supply of external power to the beacon radio node was terminated while the beacon radio node was experiencing movement; and
based on determining that the supply of external power to the beacon radio node was not terminated while the beacon radio node was experiencing movement, not performing the method of generating a message containing an identifier for beacon radio node and data indicating that the beacon radio node has been moved; and based on determining that the supply of external power to the beacon radio node was terminated while the beacon radio node was experiencing movement, performing the method of generating a message containing an identifier for beacon radio node and data indicating that the beacon radio node has been moved.

14. The method of claim 13, further comprising:
determining an elapsed time during which the supply of external power to the beacon radio node was terminated while the beacon radio node was experiencing movement; and
based on determining that the elapsed time is less than a threshold time, not performing the method of generating a message containing an identifier for beacon radio node and data indicating that the beacon radio node has been moved; and
based on determining that the elapsed time is greater than a threshold time, performing the method of generating a message containing an identifier for beacon radio node and data indicating that the beacon radio node has been moved.

15. The method of claim 10, further comprising:
determining whether supply of external power to the beacon radio node was terminated while the beacon radio node was experiencing movement; and
generating the message to further include data indicating whether supply of external power to the beacon radio node was terminated while the beacon radio node was experiencing movement.

16. The method of claim 10, further comprising:
based on the sensing of the movement, searching to identify presence of any proximately located other beacon radio node; and
generating the message to further include data identifying any other beacon radio node identified by the searching.

17. The method of claim 10, further comprising:
searching to identify presence of another proximately located other beacon radio node;
storing data identifying the other beacon radio node identified by the searching and data identifying a received signal strength for a signal received from the other beacon radio node;
based on the sensing of the movement,
repeating the searching to identify presence of any proximately located other beacon radio node, and
determining whether an identity of any other beacon radio node identified by the repeated searching matches the other beacon radio node identified by the stored data and, when a match is determined, identifying whether a received signal strength of a signal presently received from the other beacon radio node is within a defined threshold value of the received signal strength identified by the stored data;
based on determining that a match between identities is found and the received signal strengths are within the defined threshold value, not performing the method of generating a message containing an identifier for beacon radio node and data indicating that the beacon radio node has been moved; and
based on determining that a match between identities is not found or a match between identities is found but the received signal strengths are not within the defined threshold value, performing the method of generating a message containing an identifier for beacon radio node and data indicating that the beacon radio node has been moved.

18. The method of claim 10, further comprising:
searching to identify presence of another proximately located other beacon radio node;
storing data identifying the other beacon radio node identified by the searching and data identifying a plurality of received signal strength measurements for signals received from the other beacon radio node through a corresponding plurality of different physical resource channels;
based on the sensing of the movement,
- repeating the searching to identify presence of any proximately located other beacon radio node, and
- determining whether an identity of any other beacon radio node identified by the repeated searching matches the other beacon radio node identified by the stored data and, when a match is determined, identifying whether a plurality of received signal strength measurements for signals presently received from the other beacon radio node through the corresponding plurality of different physical resource channels are within one or more threshold values of the corresponding received signal strengths identified by the stored data;

based on determining that a match between identities is found and the present received signal strengths are within the one or more threshold values of the corresponding received signal strengths identified by the stored data, not performing the method of generating a message containing an identifier for beacon radio node and data indicating that the beacon radio node has been moved; and based on determining that a match between identities is not found or a match between identities is found but the present received signal strengths are not within the one or more threshold values of the corresponding received signal strengths identified by the stored data, performing the method of generating a message containing an identifier for beacon radio node and data indicating that the beacon radio node has been moved.

* * * * *